US011024199B1

(12) United States Patent
Treves et al.

(10) Patent No.: US 11,024,199 B1
(45) Date of Patent: Jun. 1, 2021

(54) FOREIGN LANGUAGE LEARNING DICTIONARY SYSTEM

(71) Applicant: Audible.com, Newark, NJ (US)

(72) Inventors: Dikla Treves, New York, NY (US); Geetika Tewari Lakshmanan, Winchester, MA (US); Yale Li, Stamford, CT (US); Aman Sagar, Hoboken, NJ (US); Dan Stefanescu, New York, NY (US); Michael Angelo Macchione, III, Glen Ridge, NJ (US)

(73) Assignee: Audible, Inc., Newark, NJ (US)

( * ) Notice: Subject to any disclaimer, the term of this patent is extended or adjusted under 35 U.S.C. 154(b) by 718 days.

(21) Appl. No.: 14/980,955

(22) Filed: Dec. 28, 2015

(51) Int. Cl.
  *G09B 19/06* (2006.01)
  *G09B 5/02* (2006.01)
  *G06F 40/242* (2020.01)

(52) U.S. Cl.
  CPC ........... *G09B 19/06* (2013.01); *G06F 40/242* (2020.01); *G09B 5/02* (2013.01)

(58) Field of Classification Search
  CPC .......... G09B 19/16; G09B 5/02; G06F 40/242
  USPC ....................................................... 434/157
  See application file for complete search history.

(56) References Cited

U.S. PATENT DOCUMENTS

| | | | | |
|---|---|---|---|---|
| 8,477,109 B1* | 7/2013 | Freed | ...................... | G06F 3/041 |
| | | | | 345/173 |
| 2002/0010707 A1* | 1/2002 | Chang | ................... | G06F 40/169 |
| | | | | 715/205 |
| 2007/0255570 A1* | 11/2007 | Annaz | .................... | G09B 19/06 |
| | | | | 704/270 |
| 2007/0269775 A1* | 11/2007 | Andreev | .................. | G09B 7/00 |
| | | | | 434/156 |
| 2011/0077937 A1* | 3/2011 | Nakajima | .............. | G09B 19/06 |
| | | | | 704/10 |
| 2011/0261030 A1* | 10/2011 | Bullock | .............. | G06F 15/0283 |
| | | | | 345/204 |
| 2016/0170612 A1* | 6/2016 | Kim | ....................... | G09B 19/06 |
| | | | | 434/157 |

* cited by examiner

*Primary Examiner* — Thomas J Hong
(74) *Attorney, Agent, or Firm* — Lee & Hayes, P.C.

(57) ABSTRACT

Described herein are techniques for providing a dictionary capabilities associated with foreign language learning content items. In some cases, a foreign language learning application operation on a device may cause definitions associated with a word to be displayed on a display of the device concurrently with the word and at least some text surrounding the word. In some cases, the definitions may be provided in the language of the content item and in a language native the user.

20 Claims, 11 Drawing Sheets

US 11,024,199 B1

FOREIGN LANGUAGE LEARNING DICTIONARY SYSTEM

BACKGROUND

A large and growing population of users is enjoying entertainment through the consumption of digital content, such as music, movies, images, electronic books, and so on. The users employ various devices with electronic displays such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth to view the digital content.

In some cases, the digital content may be utilized by users in a variety of contexts. For example, users desiring to learn a language may utilize digital content in that language to increase the user's exposure to the language, with the goal of increasing the user's fluency. In language learning applications, the absorption of language within a content item may greatly affect the ability of a user to develop foreign language skills. However, the absorption of a particular content item may vary between individual users. Consequently, selecting digital content appropriate for absorption may be challenging to the individual.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
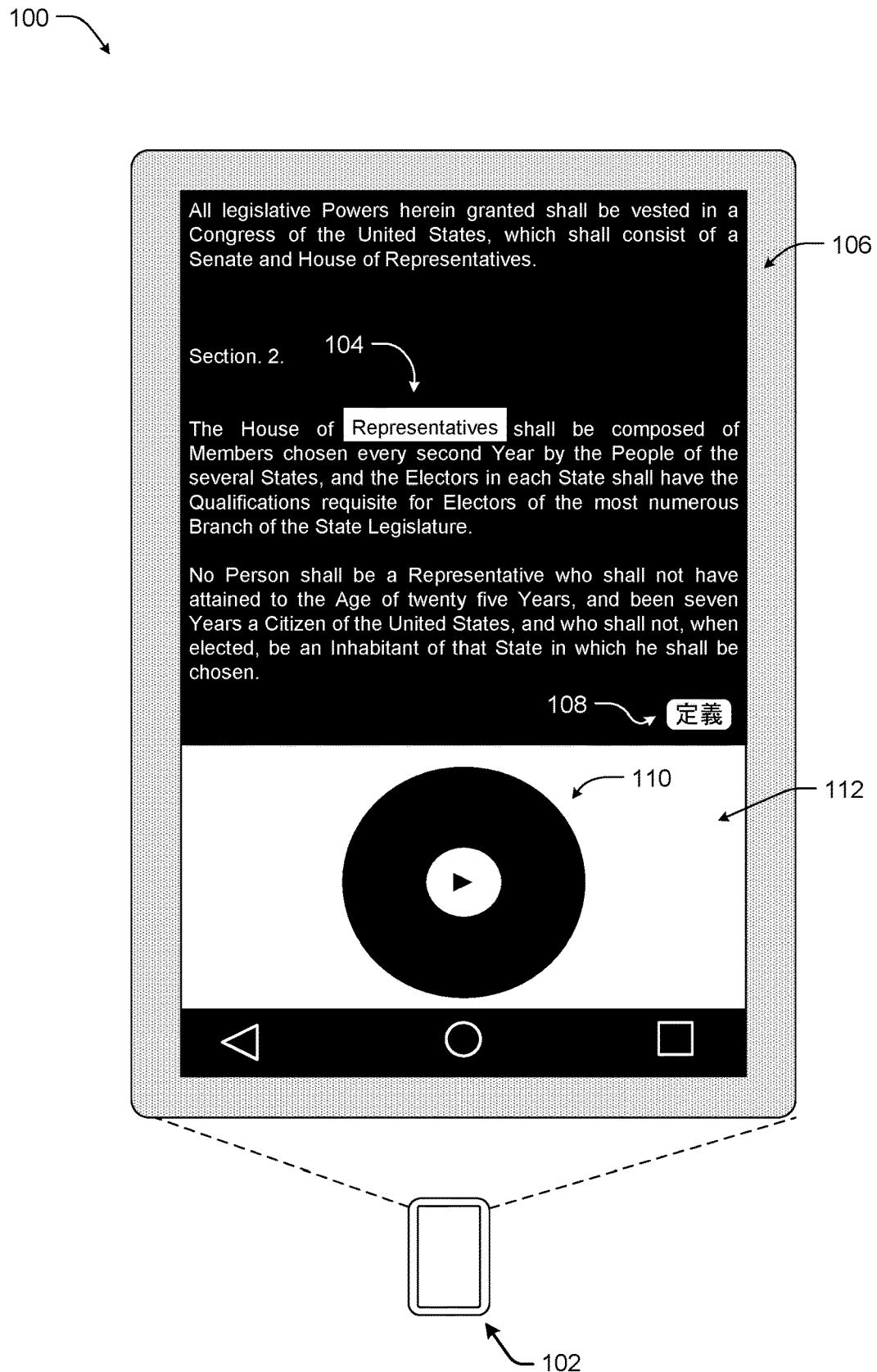
FIG. 1 illustrates an example depicting a device facilitating content consumption associated with foreign language learning.

Described herein are devices and techniques for assisting an individual in foreign language learning via consumption of electronic content items in a guided learning environment. For example, a native Japanese speaker that desires to learn English as a second language may access a foreign language learning application via an electronic device. In some cases, the foreign language learning application may access one or more cloud services, such as a content delivery system, to obtain a selection of English language titles that are also available in Japanese. The available titles may also include a difficulty level and a list of whether or not an English audio version of the title may be accessed in conjunction with the text version.

In one example, the native Japanese speaker may select a beginner title, such as a 1 on a difficult scale of 1 to 5 that has an accompanying English audio version. In some cases, the foreign language learning application may request or recommend some initial language learning settings for consuming the selected title. For example, the foreign language learning application may cause the native Japanese speaker to initial consume the title via the English audio version with text highlighting capabilities at a read rate of 0.5 that of a native English reader. Thus, the native Japanese speaker may have the title read out loud at a slow rate, while the native Japanese speaker reads along via the highlighted words. The foreign language learning application may also provide a recommended reading time per day to increase the native Japanese speaker English language absorption rate.

During consumption of the English title, the native Japanese speaker may from time to time come upon an English word the native Japanese speaker does not understand or cannot pronounce. In these cases, the foreign language learning application may allow the native Japanese speaker to access the definition of the unknown English word in line with the textual content that the native Japanese speaker is currently reading. In some cases, the foreign language learning application may present the definition in the content items native language (e.g., English) as well as the reader's native language (e.g., Japanese). In some particular cases, the foreign language learning application may also present the user with pronunciation keys and/or the ability to have the device output an audio version of the pronunciation to the user. Thus, the native Japanese speaker can view the definition and pronunciation while viewing the textual content related to the troublesome word. In this manner, the native Japanese speaker may be able to more easily grasp the meaning of the English word in the context of the related content, thereby improving the foreign language absorption rate by the reader.

In some implementations, the foreign language learning application may present ranked definitions based on the context of the content being consumed. For example, the foreign language learning application may access multiple definitions for a particular word and compare the definitions with the language surrounding the word in the content item to provide the most suitable definition of the word to the native Japanese speaker.

In other cases, one or more cloud based services may rank the definitions based on the content on behalf of the foreign language learning application. For example, the user devices hosting the foreign language learning application may be in communication with a cloud-based or central server foreign language learning system that assists with facilitate the foreign language learning and/or dictionary capabilities to each individual user, accepting, categorizing, and assigning of difficulty ranking to each title, delivering the foreign language learning titles to the user devices, syncing the audio as well as the different language text as the individuals consume the foreign language learning titles.

The cloud-based or network connected foreign language learning system may include various other systems for carrying out particular tasks associated with the guided learning system described herein. For instance, a content learning system may be configured to identify or receive content items from third party content provides (such as publishers, writers, authors, distributors, etc.). The content learning system upon receipt of a particular content item or title, contact one or more third party content providers in order to acquire the rights to distribute a foreign language version of the same content item (e.g., the English language content item and the Japanese language equivalent). The content learning system may also contact one or more third party audio content providers to acquire the rights to the audio version for the for the desired foreign language (e.g., for the native Japanese speaker learning English by consuming English titles the content learning system may obtain the rights to the English audio).

The foreign language learning system may also include a dictionary system to generate or curate additional content that may be useful in learning the foreign language while the titles are being consumed. For example, the foreign language learning content creation system may include a dictionary module or system that may obtain dictionary definitions and pronunciations for words associated with one or more titles in the language being acquired, such that the dictionary definitions and pronunciations may be provided to the reader as the foreign language learning content is being consumed to assist with reading comprehension.

The foreign language learning system may also include a content leveling system to rank a difficultly associated with reading a particular title. For example, the content leveling system may upon receipt of a content item, strip punctuation and case from the text of the content, tokenize whitespace and special characters, and identify individual words of the text. The content leveling system may then compare the identified words with one or more dictionaries, such as the New General Service List (NGSL), to identify the number or percentage of words in the text of the content item or title that are also present in the dictionary. The content leveling system may then make a determination as to the difficult of a particular content item based in part on the number of words appearing in the dictionary or the percentage of words in the dictionary. The content leveling system may also consider the length of the words, the length of the definitions, the number of definitions, the number of syllables, the length of the pronunciation key, etc.

The foreign language learning system may also include a foreign language metadata system to for example associated Japanese metadata to an English title in order to assist the native Japanese reader with selecting an English title of interest. For example, the foreign language metadata system may assign Japanese language identifies such as " 神秘 " (mystery), " ビクトリア時代 " (Victorian era), or " 女性主人公 " female protagonist), among others. In this manner, the native Japanese reader may select titles of interest to the reader by previewing the Japanese tags rather than merely selecting a title with no concept of the subject matter or based on the native Japanese reader's current limited understanding of English.

In some cases, the foreign language learning system may also include a content delivery system. In the example, of the native Japanese speaker consuming English titles, the content delivery system may provide the English language text and Japanese langue text the native Japanese speaker's device. The content delivery system may also contact one or more third party audio content delivery systems to cause the third party audio content delivery system to stream the English language audio to the native Japanese speaker's device in coordination with the consumption of the English language text. In other cases, the content delivery system may monitor the delivery of the audio content via one or more synchronization files maintained on the native Japanese speaker's device.

In some particular implementations, the foreign language learning system may also include a content authorization system to determine if the native Japanese speaker is authorized to consume the foreign language learning content. For example, the authorization system may determine the native Japanese speaker has licensed the English text, the Japanese text, and the English audio before allowing the native Japanese speaker to consume the content.

FIG. 1 illustrates an example 100 depicting a device 102 hosting a foreign language learning application facilitating content consumption associated with foreign language learning. For example, as discussed above a native Japanese speaker may be consuming an English title, such as the United States Constitution in the illustrated example, in order to learn the English language. In this example, the native Japanese speaker is consuming the English title via the English text and English audio. For instance, the word "Representatives" 104 is currently highlighted causing the Japanese speaker to read the word "Representatives" 104 as the device output the audio pronunciation of the word "Representatives" 104. In this way, the native Japanese speaker both reads words and listening to the pronunciation in tandem.

In the illustrated example, the text of the English title is displayed in a display area 106 and a control interface 110 is displayed in a control area 112. Thus, the native Japanese speaker may consume the text displayed in the display area 106. From time to time, the native Japanese speaker may come upon an English word, such as the word "Representatives" 104, that the native Japanese speaker is unfamiliarly with or does not under the native Japanese Speaker's current understanding of the word fit into the content of the text displayed in the display area 106. In these instances, the native Japanese speaker may access a dictionary via the foreign language learning application, for example, by long pressing or tapping on the word 104, or by selecting a definitions options, generally indicated by 108, in order to cause dictionary definitions associated with the word to appear in the native language of the reader (e.g., for the native Japanese speaker in Japanese).

Figure 2:
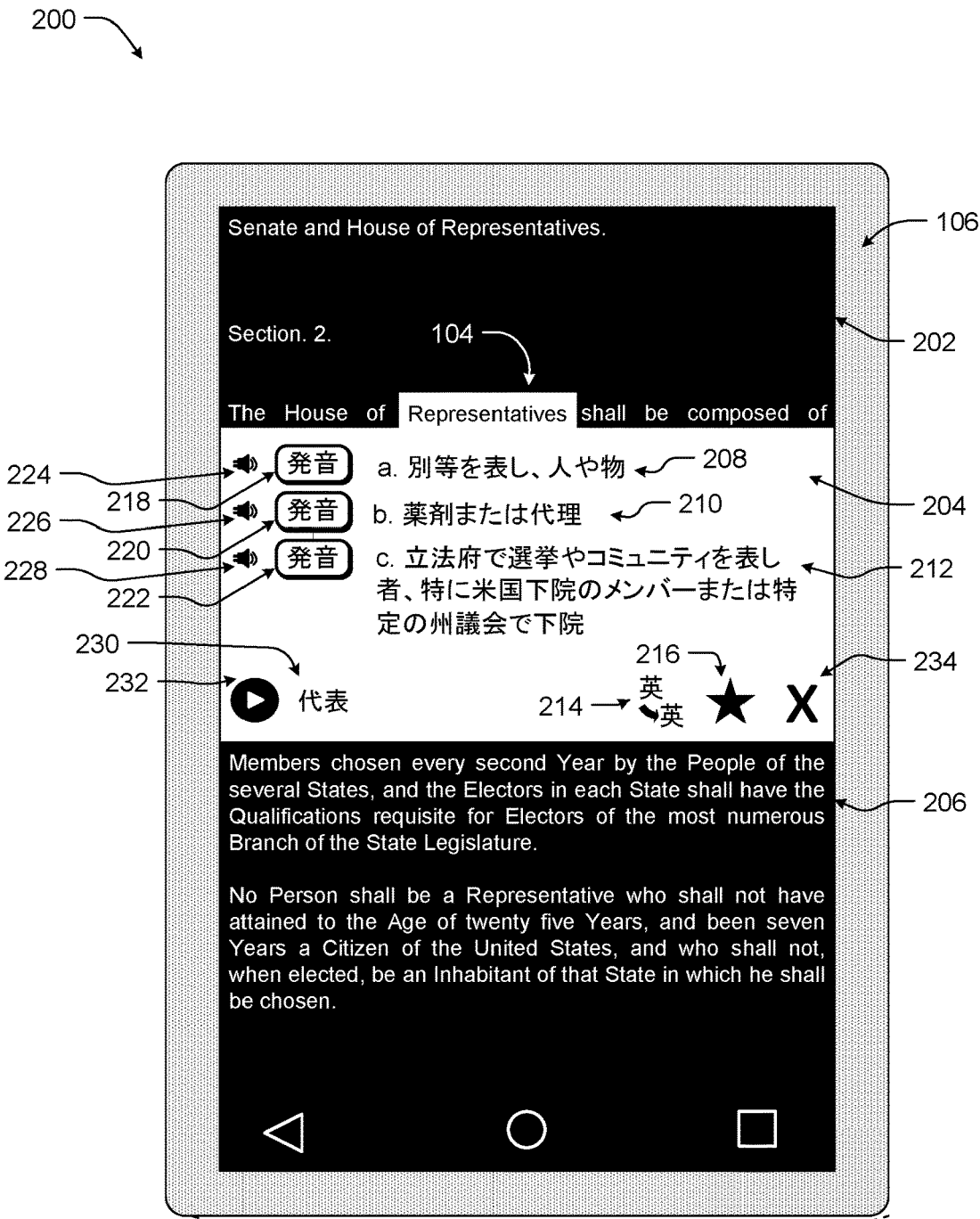
FIG. 2 illustrates an example depicting a device facilitating content consumption associated with foreign language learning dictionary lookup.

FIG. 2 illustrates another example 200 depicting a device 102 facilitating content consumption associated with foreign language learning dictionary lookup. As described above, at points in time, a user of the foreign language learning application may come upon a foreign word, such as the highlighted word "Representatives" 104 in the illustrated example, that the user is unfamiliarly with or does not understand the meaning of the word in the current content of the text. Thus, in the illustrated example, the user has accessed a dictionary definitions of the word "Representatives" 104 via the foreign language learning application. For instance, the user may have long pressed or tapped on the word 104 to cause dictionary definitions associated with the word 104 to appear in the native language of the user (e.g., for the native Japanese speaker in Japanese as shown).

In the illustrated example, the display area 106 has been partitioned into three portion, a first text portion 202, a dictionary portion 204, and a second text portion 206. The first text portion 202 and the second text portion 206 each display part of the text previously presented in the display area 106. As shown, the text of the foreign language learning content item has been split into text above the dictionary portion 204 and displayed in the text portion 202 and text below the dictionary portion 204 and displayed in the text portion 204, such that the user may view the dictionary portion 204 while still reading the text surrounding the word 104 to provide context to the definitions 208-212.

In this example, even though the dictionary portion 204 has been added to the display, the entirety of the text displayed with respect to FIG. 1 (e.g., prior to opening the dictionary) is maintained on the display to enable the user to refer to the text while viewing the definitions. For instance, the control area 112, shown with respect to FIG. 1, has been pushed down off the screen to allow the entirety of the text to be maintained on the display. In an alternative implementation, the combined text of the first text portion 202 and the second text portion 206 may be less than the text previously shown in display area 106 to accommodate the dictionary portion 204. However, the word 104 that the user is looking up and the text immediately surrounding the word 104 remain within one of the two text portions 202 or 206.

The dictionary portion 204 includes a number of definitions associated with the word 104. For instance, some words may include multiple definitions depending on the context, part of speech (e.g., used as a verb versus a noun), etc. In some cases, the foreign language learning system including the foreign language learning application operation on the device 102 and/or one or more cloud based services may rank the definitions 208-212 based on the definition that is most likely appropriate for the current context of the text displayed in the display area 106.

In the illustrated example, the dictionary portion 204 includes three definitions 208-212. The definitions 208-212 are originally displayed in the user's native language (in the current example, Japanese), such that the user is able to read and understand the definitions 208-212 without undue confusion associated with reading foreign language words. In some cases, however, the user may desire to see the definitions in the language of the text (in the current example, English). In these cases, the device 102 may also display a selectable option 214 to switch between the user's native language and the language of the foreign language learning content item.

In some cases, the foreign language learning system including the foreign language learning application operating on the device 102 and/or one or more cloud based services may also present the user with an option 216 to add the highlighted word 104 to a list of study words and/or vocabulary builder ((or remove the word 104 from the list of study words and/or vocabulary builder if the word 104 was previously added). In some example, by selecting the option 216 the user may cause the system to quiz the user later with respect to the definitions 208-212 and/or the use of the word 104 at a later time. For instance, the system may quiz the user on a select number or predefined number of words included in a vocabulary builder list or study word list upon activation of the foreign language learning application on the device 102, at predetermined intervals of time, or prior to closing the application on the device 102, as well as in other situations.

In some implementations, the dictionary portion 204 may include options 218-222 to cause the definitions 208-212 to be replaced with pronunciation keys in the language of the text of the foreign language learning content item, as described in more detail below with respect to FIG. 3. The dictionary portion 204 may also include options 224-228 to cause the device 102 to output the word 104, via one or more speakers, in an audible format. In some cases, the word 104 may be output in the language of the text of the content item, while in other cases the word 104 may be output in the native language of the user to improve the user's understanding of the word 104. In some particular cases, the word 104 may be output within a sentence to provide context to the corresponding definition. For instance, in the illustrated example, select the option 224 may cause the device 102 to output the phrase: "the representative voted to approve the bill" to provide context for the definition 208.

The dictionary portion 204 may also include a translation of the word 104 into the native language of the user, generally indicated by 230, and an option 232 to resume consuming the content. For example, by selecting the option 232 the application may resume reading the text of the content item to the user, while highlighting the text along with the audio output. The dictionary portion 204 may also include an option 234 to cause the device 102 to close the dictionary portion 204 and return the display area 106 to the state shown with respect to FIG. 1, such as to allow the user to continue to consume the foreign language content item.

Figure 3:
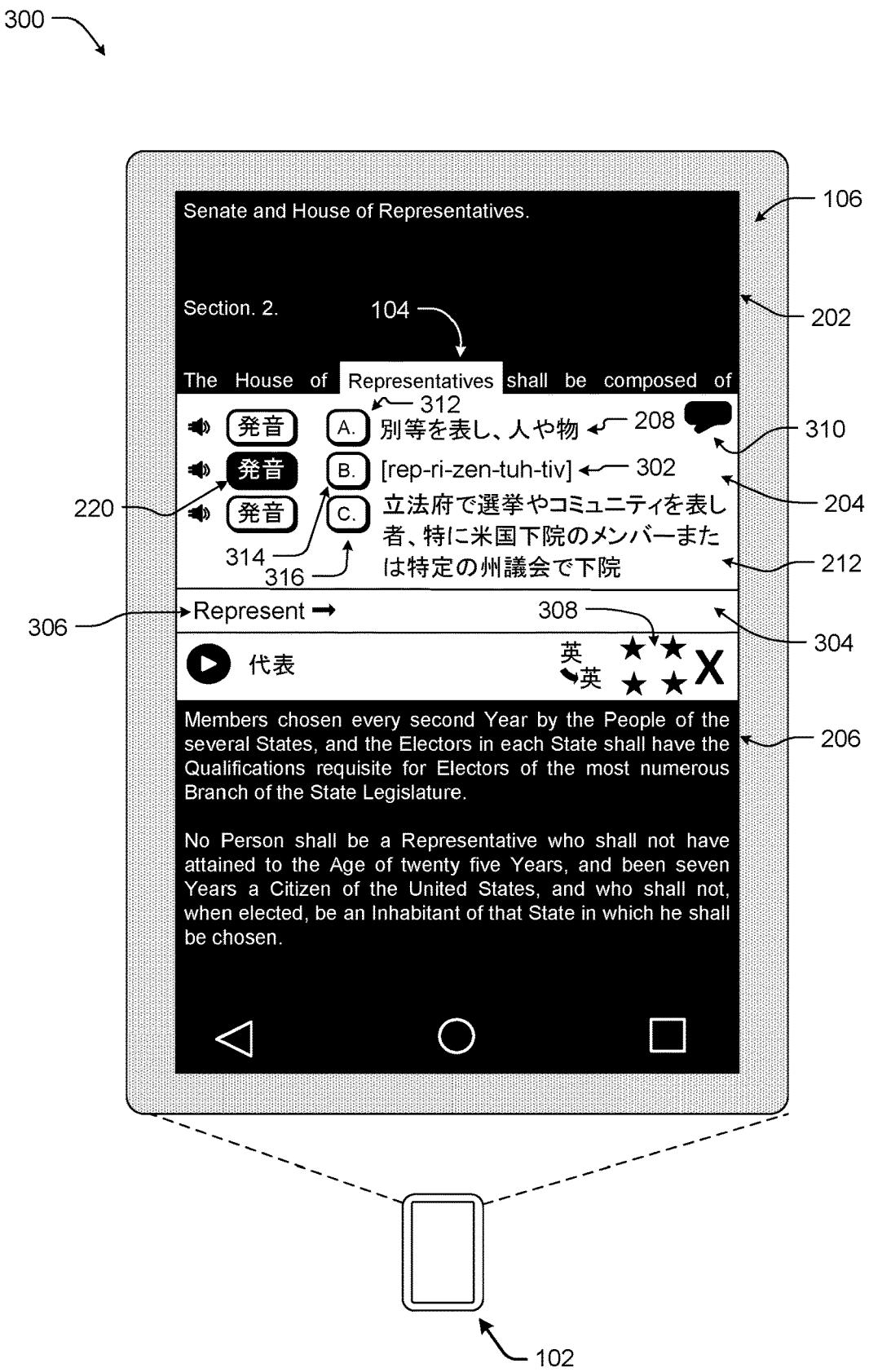
FIG. 3 illustrates another example depicting a device facilitating content consumption associated with foreign language learning dictionary lookup.

FIG. 3 illustrates another example 300 depicting a device 102 facilitating content consumption associated with foreign language learning dictionary lookup. Similar to the example illustrated with respect to FIG. 2 above, in the current example, the user has stopped consuming the foreign language learning content item to lookup the word "Representatives" 104. Once again, the foreign language learning application has caused the device 102 to display the first text portion 202, the dictionary portion 204, and the second text portion 206, thereby allowing the user to view the definitions associated with the word 104 together with the text surrounding the word 104 to provide context and assist with foreign language absorption.

In the illustrated example, the user has selected the option 220 causing the definition 210 to be replaced with a pronunciation key 302 to assist the user with pronouncing the word 104. In some implementations, the pronunciation key 302 may be the same for each definition 218-222, however, in other implementations the pronunciation key 302 may be specific for the definition 220. For example, in some language, words may be pronounced differently depending on the use of the word and/or the context of the word The illustrated example also includes a fourth portion 304 of the display area 106 for providing alternative spellings, tenses, part of speech, etc. associated with the word 104. For instance, in the current example, the word "Represent" 306 is shown since the words "Representative" 104 and "Represent" 306 are related (e.g., the noun and the verb). In some cases, the word 306 may also be a selectable option that upon selection will provide the user with information related to the word 306, an option to provide the most frequent definition or a highlighted definition. For instance, upon selection the definitions portion 204 may be replaced with definitions associated with the word 306 rather than the word 104.

As discussed above with respect to FIG. 2, the foreign language learning system may also present the user with an option 216 to add the highlighted word 104 to a list of study words and/or vocabulary builder ((or remove the word 104 from the list of study words and/or vocabulary builder if the word 104 was previously added). However, in the current example, the selecting the option 216 may be replaced with multiple buttons, generally indicated by 308, to allow the user to add the word 104 to multiple independent lists. For instance, the user may add the word 104 to a study word list and to a list of difficult word.

The display area 204 may also include a user selectable pop-out option 310 to cause the dictionary portion 204 to be displayed in a text box or bubble over the text displayed in portions 202 and 206. Alternatively, the pop-out option 310 may cause the portions 202 and 206 to move off the screen. In some cases, the pop-out option 310 may cause more definitions to be displayed or the pronunciation keys to be displayed adjacent to the definitions. In some implementations, the dictionary portion 204 may also include selectable options 312-316 to toggle between the definition in the user's native language and the word 104 in the user's native language. For example, by selection option 316 the word 104 may be displayed using the Japanese equivalent given the corresponding definition 212. For example, the word 104 "Representatives" in English may mean both "a person or thing that represents another or others" and "an agent or deputy". However, in Japanese the word for "a person or thing that represents another or others" may be different from the word that signifies an agent or deputy". Thus, by selection the options 312-316, the user may view a native language word that is associated with the displayed definition.

Figure 4:
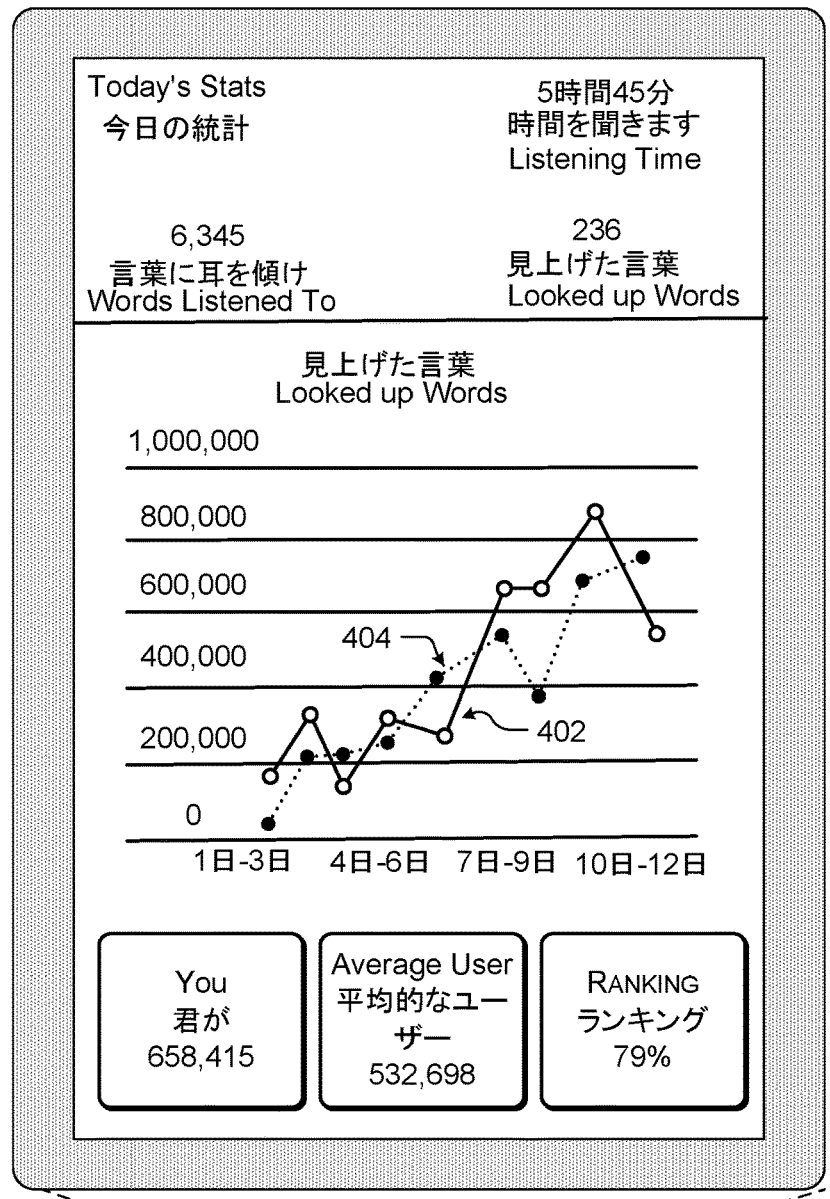
FIG. 4 illustrates an example depicting user progress associated with the foreign language learning.

FIG. 4 illustrates an example 400 depicting user progress associated with the foreign language learning. For example, the foreign language learning system including the foreign language learning application and/or one or more cloud based services may track or monitor a user's progress or time spent consuming foreign language content. In this manner, the system may provide the user with feedback as to current progress and/or expected progress. In some instance, as in the illustrated example 500, the system may track the number of words looked up via the dictionary portion 206 of FIGS. 2 and 3. In other instance, the system may track the user progress by measuring the number of words the user has marked or unmarked as difficult or as study words, number of words marked as mastered, number of words the user paused on, number of times the user accessed dictionary definitions or audio pronunciations of words, time spent reviewing dictionary definitions, relationship between words looked up or marked as difficult/ mastered, number of pauses, number of audio replays, number of toggles operating modes, narration speed or read rate associated with the title, among others.

In the illustrated example 400, the system has measured the number of words the user has looked up the definitions for and causes the device 102 to display solid line 502 showing the number of words the user looked up to over multiple three week periods. The system has also tracked and measured a number of words an average user has looked up to and displayed, the average user's progress via dotted line 504. As shown, the current user has looked up to more words over most of the weekly periods as well as overall than the average user.

In some cases, the system may also cause the device 102 to display the number of words looked up, the number of words an average user has looked up, and the user's percentile over all users. In this manner, the user is able to determine if the user is on track with other users having the same native language and learning the same language (such as in the example above other native Japanese speakers learning English).

Figure 5:
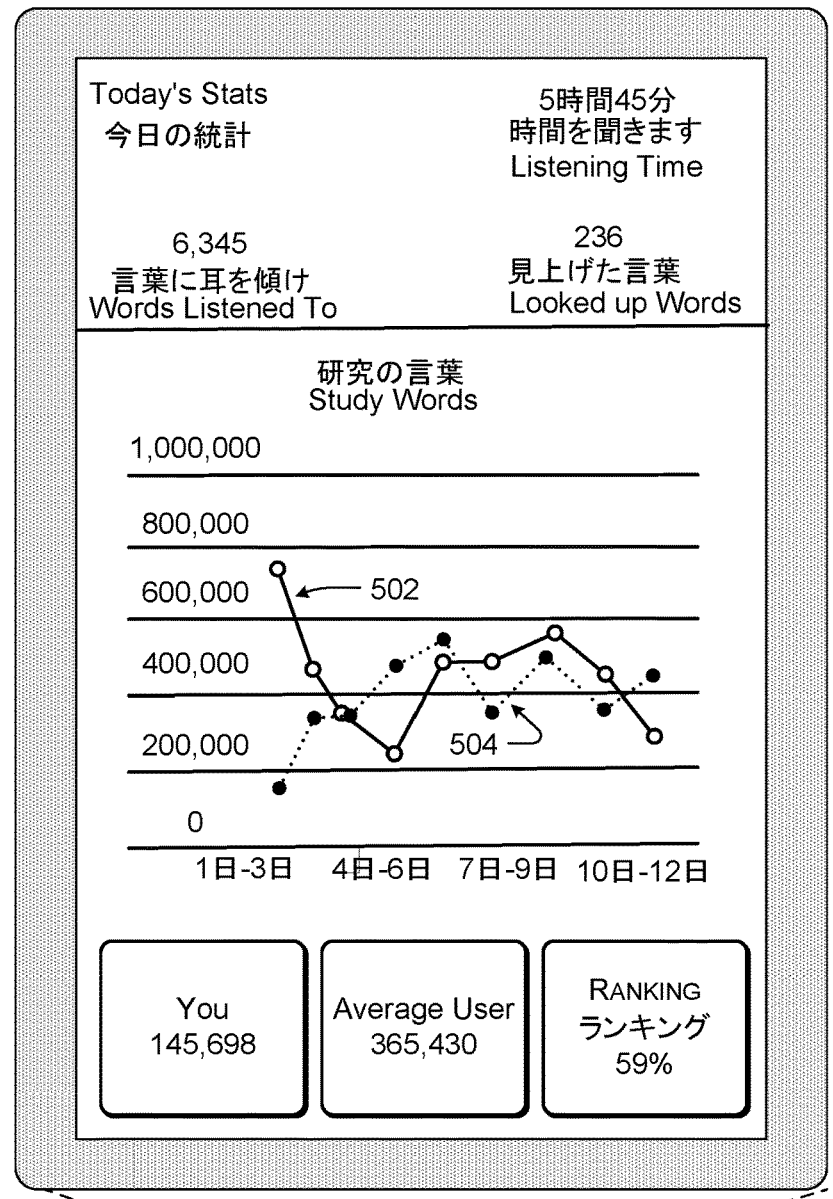
FIG. 5 illustrates another example depicting user progress associated with the foreign language learning.
Figure 5:
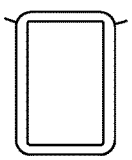

FIG. 5 illustrates another example depicting user progress associated with the foreign language learning. For example, the foreign language learning system including the foreign language learning application and/or one or more cloud based services may track or monitor a user's progress or time spent consuming foreign language content. In this manner, the system may provide the user with feedback as to current progress and/or expected progress. In some instance, as in the illustrated example 500, the system may the number of words the user has marked as study words. For example, the system may periodically quiz the user based on the words marked as study words to help the user to master word the user finds as difficult or uncommon.

In the illustrated example 600, the system has tracked the number of words added to the study word list over each period and causes the device 102 to display solid line 602. The system has also tracked and measured the number of word an average user has added to the study word list and displayed, the average user's progress via dotted line 604.

In some cases, the system may also cause the device 102 to display the total number of word the user added to the study word list, total number of words the average user added to the word list, and the user's percentile over all users. In this manner, the user is able to determine if the user is on track with other users having the same native language and learning the same language (such as in the example above other native Japanese speakers learning English).

Figure 6:
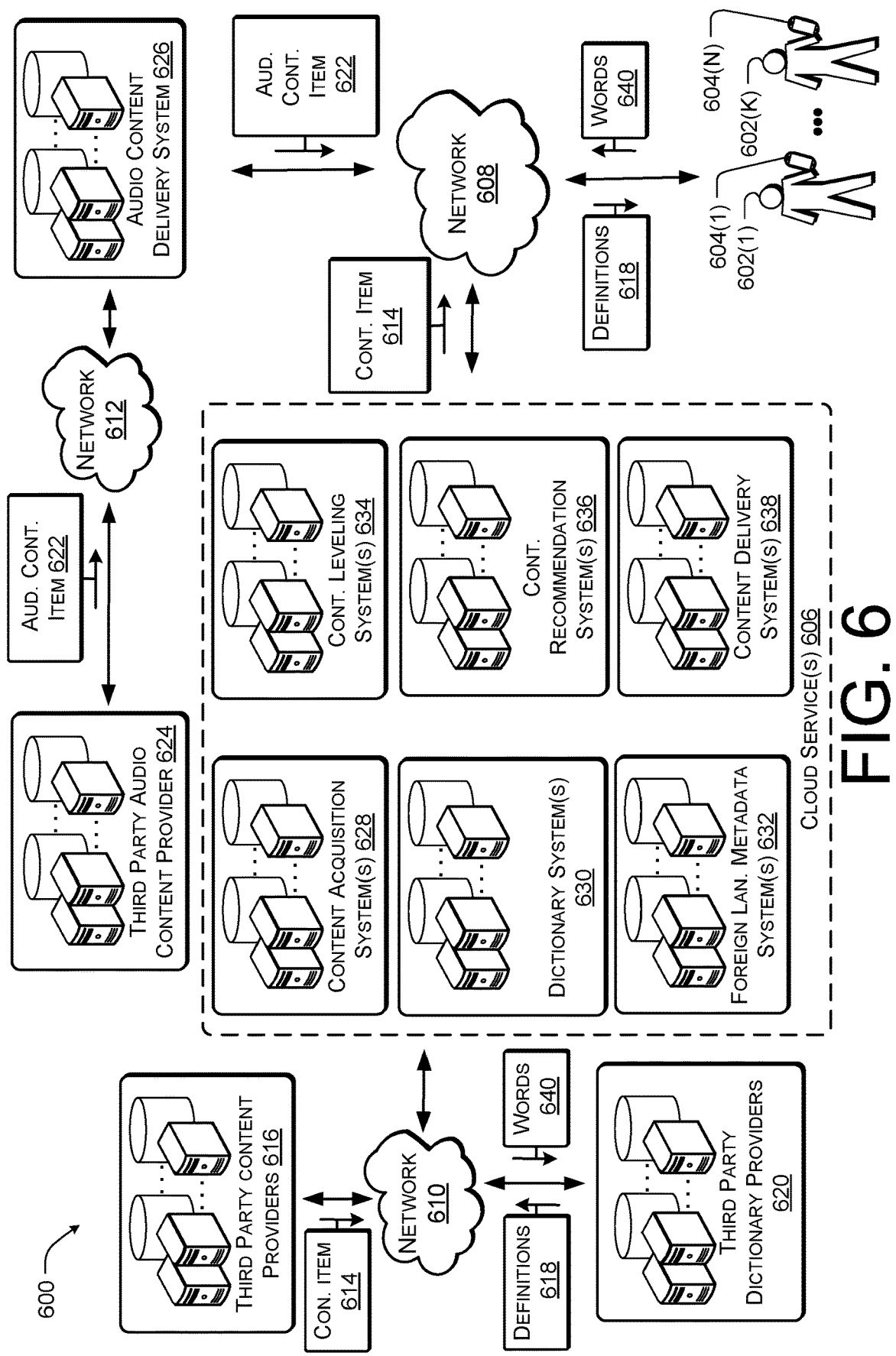
FIG. 6 illustrates an example architecture of a system for providing language learning content to a user device.

FIG. 6 illustrates an example architecture of a system 600 for providing language learning content to one or more users 602(1)-(K) (e.g., the native Japanese speaker described above) via corresponding user devices 604(1)-(N). In the illustrated example, the users 602(1)-(K) access the foreign language learning system 600 via the user devices 604(1)-(K) but are communicatively coupled to remote cloud services 606 accessible via a network, generally indicated by 608, for providing the foreign learning content and/or dictionary definition and pronunciation keys to the devices 604. The remote cloud services 606 may also receive assistance from various other third party systems via one or more networks, generally indicated by 610 and 612. For example, the cloud services 606 may receive content items 614 from one or more third party content providers 616 and definitions and/or pronunciation keys 618 from one or more third party dictionary providers 620. The system 600 may also receive audio content items 622 corresponding to the content items 614 via third party audio content providers 624. The system 600 may also utilize one or more audio content delivery systems 626 to provide the audio content 622 to the user devices 604.

In the illustrated example, the device 604(1)-(K) are shown as a handheld computing device but it should be understood that the devices 604 may be implemented as any type of electronic device capable of presenting information to a user and receiving user input in response. For example, the devices 604 may include electronic devices, cell phones, smart phones, tablets, general purpose computers, notebook computers, desktop computers, electronic readers, among other type of known computing devices.

The networks 608, 610, and 612 may be representative of wired technologies (e.g., wires, USB, fiber optic cable, etc.), wireless technologies (e.g., RF, cellular, satellite, Bluetooth, etc.), or other connection technologies. The networks 608, 610, and 612 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The networks 608, 610, and 612 carry data between the third party providers 616, 620, 624, and 626, the cloud services 606, and/or the user devices 604.

The cloud services 606 generally refer to a network accessible platform implemented as a computing infrastructure of processors, storage, software, data access, and so forth that is maintained and accessible via a network such as the Internet. The cloud services 806 do not require end-user knowledge of the physical location and configuration of the system that delivers the services. Common expressions associated with cloud services 806 include "on-demand computing," "software as a service (SaaS)," "platform computing," "network accessible platform" and so forth.

In the illustrated example, the cloud services 606 include various systems that may perform actions associated with the foreign language learning system. For instance in the illustrated example, the cloud services 606 includes a content learning system 628, a dictionary system 630, a foreign language metadata system 632, a content leveling system 634, a content recommendation system 636, and a content delivery system 638.

The content learning system 628 may be configured to identify or receive content items from the third party content provides 616 (such as publishers, writers, authors, distributors, etc.). The content learning system 628 upon receipt of a particular content item 614 or title, contact one or more third party content providers 616 in order to acquire the rights to distribute a foreign language content item (e.g., the foreign version of the same content item 614, such as the Japanese language equivalent of an the English language content item). The content learning system 628 may also contact one or more third party audio content providers 624 to acquire the rights to the audio version for the for the desired foreign language.

The dictionary system 630 may generate or curate additional content that may be useful in learning the foreign language while the content items 614 are being consumed. For example, the dictionary system 630 may include a dictionary module or system that may obtain dictionary definitions and/or pronunciation keys 618 for words 640 selected by the user devices 604. In some cases, the dictionary system 630 may obtain and provide definitions and/or pronunciation keys 618 in the native language of the user 602 and/or in the language of the content item 614 currently being consumed on the user's 602 device 604, as described above with respect to FIGS. 1-3.

The foreign language metadata system 632 may be configured to, for example, associated foreign language metadata to the content item 614 in order to assist the foreign language reader with selecting a title of interest. For example, the foreign language metadata system 632 may assign language identifies associated with genre, characters, plot, subject matter, title, etc. In the foreign language to assist with title selection. In this manner, the foreign language reader may select titles of interest by previewing the foreign language tags rather than merely selecting a title with no concept of the subject matter or based on the foreign reader's current limited understanding of language being acquired.

The content leveling system 634 may be configured to rank a difficultly associated with reading a particular content item 614. For example, the content leveling system 634 may upon receipt of a content item 614, strip punctuation and case from the text of the content item 614, tokenize whitespace and special characters, and identify individual words of the text. The content leveling system 634 may then compare the identified words with one or more dictionaries (not shown) to identify the number or percentage of words in the text of the content item 614 or title that are also present in the dictionary. The content leveling system 634 may make a determination as to the difficult of a particular content item 614 based in part on the number of words appearing in the dictionary or the percentage of words in the dictionary. The content leveling system 634 may also consider the length of the words, the length of the definitions, the number of definitions, the number of syllables, the length of the pronunciation key, etc.

The content recommendation system 636 may be configured to recommend language learning content items 636 that may be of interest to particular readers acquiring the foreign language. In some cases, the content recommendation system 636 may select the recommended titles based at least in part on information known about the reader (e.g., previously consumed titles in the foreign language and/or in the readers native language, titles abandoned by the user, user survey data, user settings, user browsing history, search history, time spent on similar titles etc.), information known about the content items 614 (e.g., chapter titles, native language metadata tags, foreign language metadata tags, publisher information, subject matter, content difficulty level, etc.), as well as information aggregated across users (e.g., user comments, what other content items or titles were consumed by readers that completed the recommend language learning content items 636, etc.) current on selected titles, completed titles, abandoned titles (e.g., titles that the user failed to finish).

The content delivery system 638 may assist with delivering the content items 614, the foreign language version of the content item 614, and synchronizing the audio output provided by the third party audio content delivery system 626 at the user device 604. For example, the content delivery system 638 may facility downloading or streaming of the content items 614 to the user device 604. The content delivery system 638 may also receive notifications from the user device 604 when the user is consuming the content items 614 and, for instance, via the notification the content delivery system 638 may monitor the output of the audio content 618 with the content items 614 to ensure the output is synchronized. In one particular example, the content delivery system 638 may periodically receive synchronization files including information related to the output of the streamed audio content item 618 and the output of the content items 614. The content delivery system 638 may modify the synchronization files and return to the device 604 if the audio content item 618 and the content items 614 are out of alignment. The foreign language learning application operation on the device 604 may then utilize the modified synchronization files to re-synchronize the audio content item 618 and the content items 614.

In one example, the third party audio content provider 816 may upload a content item 614 (such as an English title) to the foreign language learning cloud services 606. The content learning system 628 associated with the cloud service 606 may contact an additional third party content provider 616 to determine if the foreign language content item exists (e.g., the Japanese language version) and to obtain the rights to distribute with the content item 614. The content learning system 628 may also contact one or more third party audio content providers 624 to acquire the rights to the audio content item 618 (e.g., the audio English book) of the content item 614.

Once the content item 614, the audio content item 618, and the foreign language version of the content item 614 are acquired by the content learning system 628 from the content providers 616 and 624, the foreign language metadata system 632 may assign foreign language (e.g., Japanese language metadata) to the content item 614 to assist the foreign language reader (e.g., the Japanese reader) with selecting a title of interest. Similarly, the content leveling system 634 may ranks a difficultly associated with reading the content item 614.

A user 802 (e.g., the native Japanese speaker) may request to access the content item 814 in order to acquire foreign language (e.g., English) skills. The content delivery system 638 may stream or download the content item 814 to the user device 604 corresponding to the user 602. The content delivery system 638 may also contact the audio content delivery system 826 to stream the audio content item 618 to the user device 604 in synchronization with the consumption of text of the content item 814 by the user 602. Alternatively, when the user 602 access the content item 814, the device 604 or the foreign language learning application operating on the device 604 may both access the audio content delivery system to the streaming audio content item 618 to the device and provide synchronization files to the content delivery system 638. The content delivery system 638 monitors and modifies the synchronization files to ensure the audio content item 618 is synchronized with the text of the content item 614.

As the user 602 is consuming the text of the content item 614, the user 602 may be uncertain as to a meaning of a particular word 640. In these cases, the user may look up the meaning of the word 650 by accessing a dictionary utility available via the foreign language learning application operating on the device 604. The dictionary utility in some causes may cause the device 604 to provide the word 650 to the dictionary system 630 via one or more network connections. In some instance, the dictionary utility may also cause the device 604 to provide text (such as a phrase, sentence, paragraph, page, or predetermined number of words or sentences before and/or after the word 650 within the text) to provide the dictionary system 630 context associated with the word 650. The dictionary system 630 may utilize one or more third party dictionary providers 620 to obtain the definitions 618 associated with the word 650. The dictionary system 630 may then analyze the text provided with the word 650 to determine a context, part of speech, etc. associated with the word 650 to rank the definitions 618 in a manner to provide the most relevant definition as the first definition to assist the user in learning the foreign word 650.

In some instance, the dictionary system 630 may also access definitions 618 form the dictionary providers 620 in the native language of the user and provided the foreign language definitions 618 together with the definitions 618 in the language of the text to further assist the user with learning the meaning of the particular word 650. In some instance, such as the example associated with FIG. 7 below, in addition to the definitions 618 the dictionary system 630 may provide the device 604 with pronunciation keys associated with the word 650, sentences using the word 650, audio recordings of individuals specking the word 650 or sentences using the word 650, etc. to further assist the user in understanding the meaning of the foreign word 650.

Figure 7:
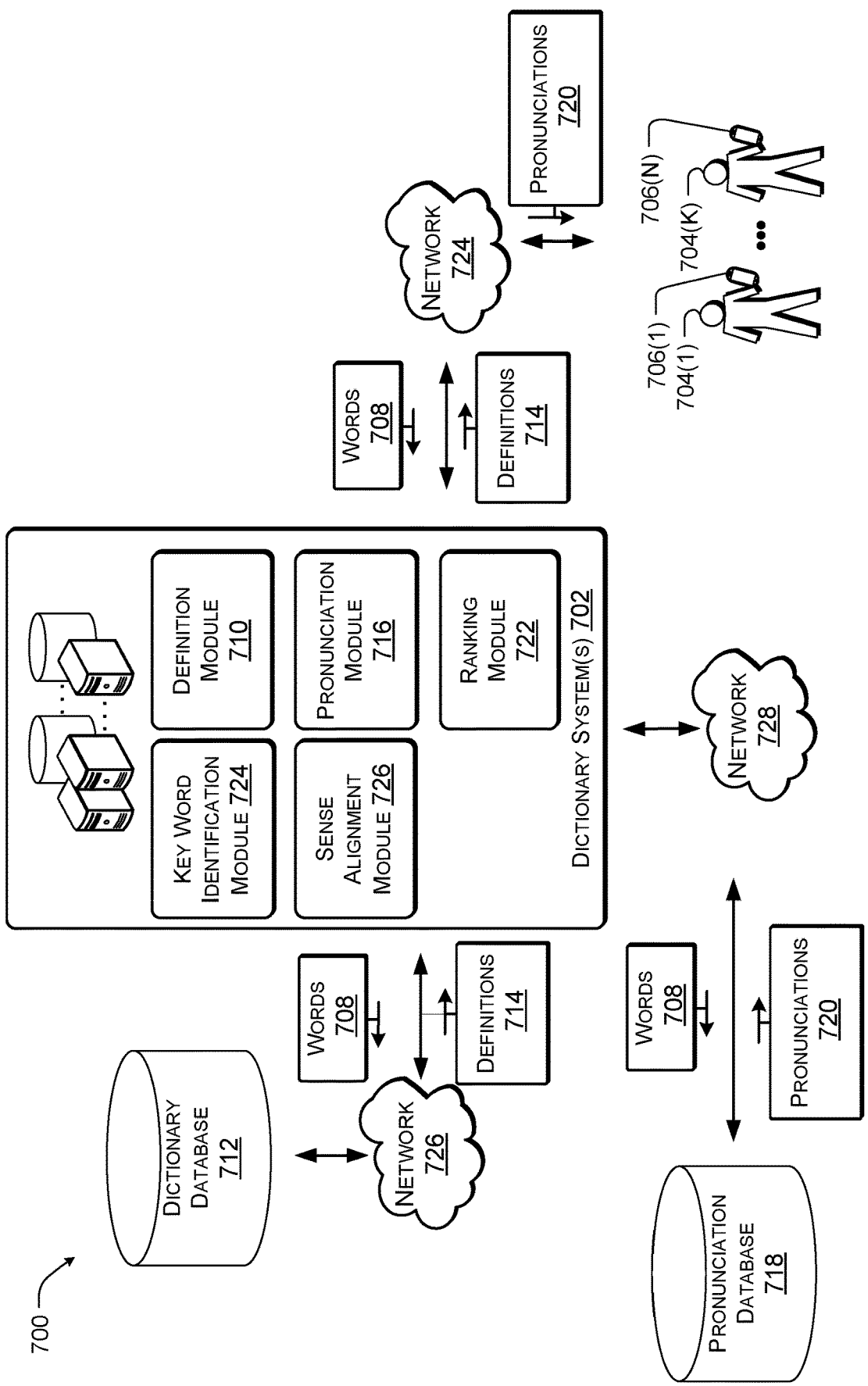
FIG. 7 illustrates an example architecture of a system for providing dictionary capabilities associated with foreign language learning.
Figure 8:
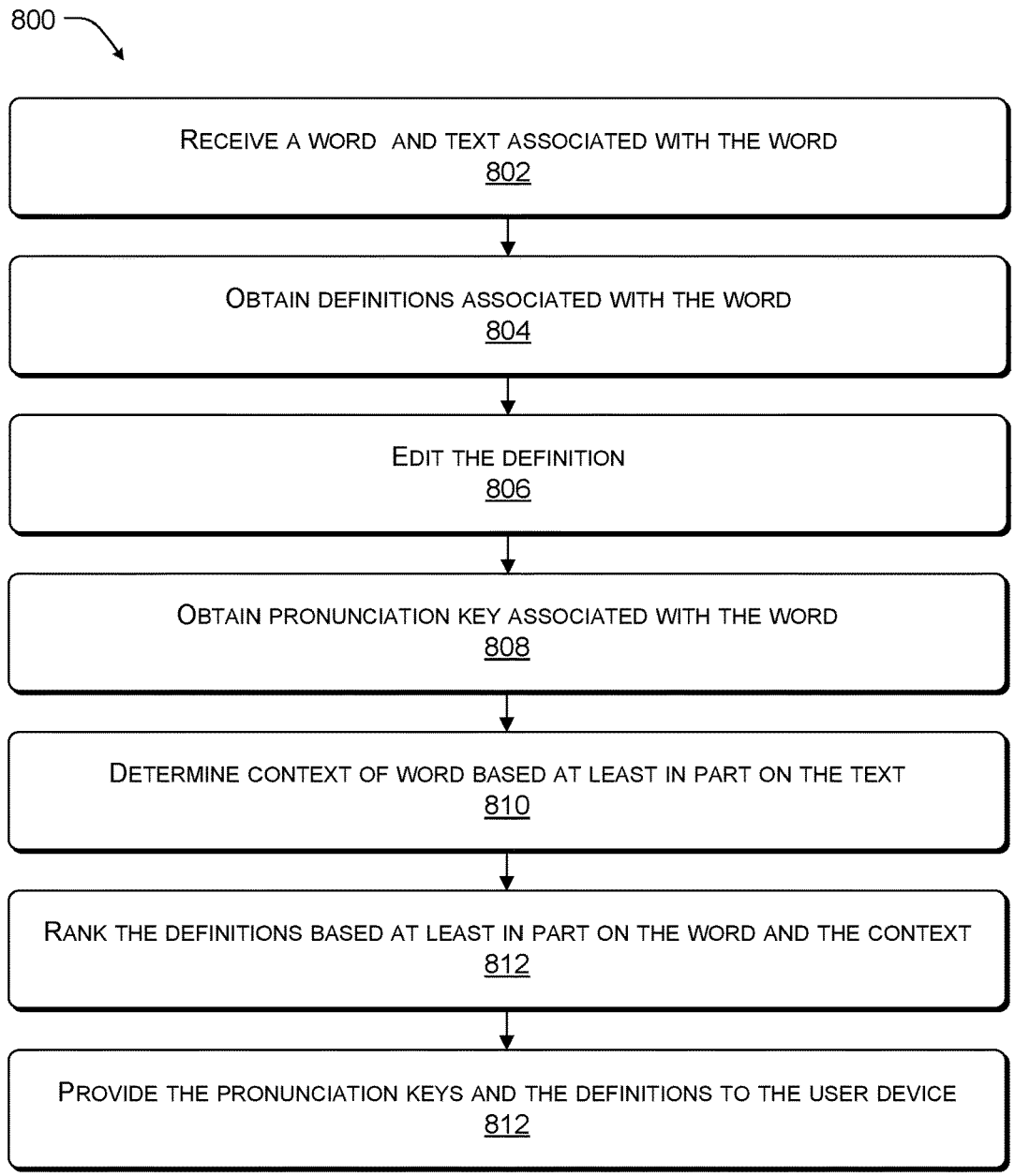
FIG. 8 illustrates an example flow diagram showing an illustrative process for providing foreign language dictionary definitions.
Figure 9:
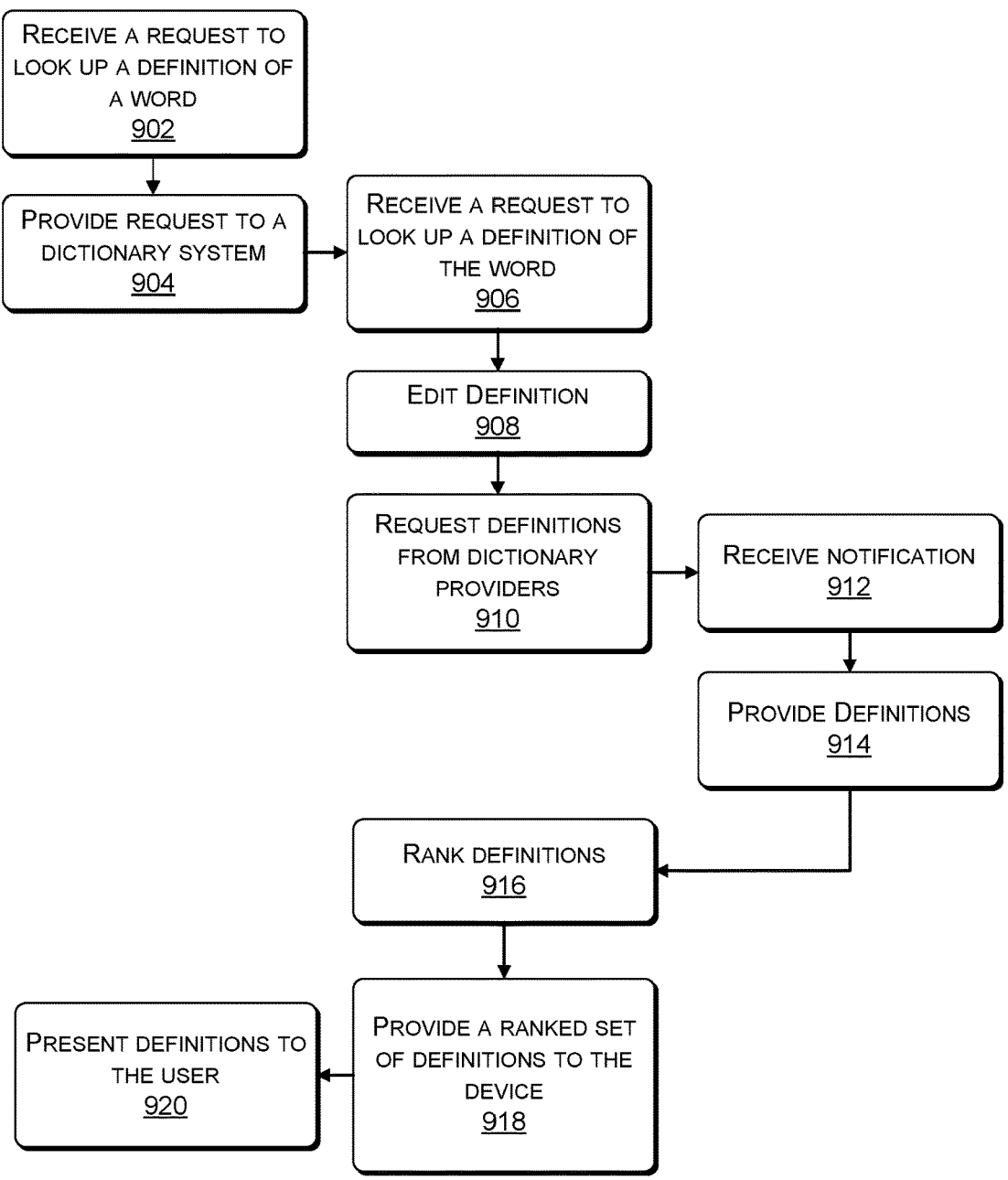
FIG. 9 illustrates an example flow diagram showing an illustrative process for selecting definitions to provide as foreign language dictionary definitions.

FIG. 7 illustrates an example architecture of a system 700 for providing dictionary capabilities associated with foreign language learning. While FIG. 8 provides an overall architecture of select components of a foreign language learning system, the example illustrated in FIG. 9 provides a more detailed architecture associated with the dictionary system 702. For instance, in the illustrated example as content items are consumed by a use 704(1)-(K) via one or more user devices 706(1)-(N), a user 704 may come across a word 708 in a foreign language that the user 704 is unfamiliar with or does not understand given the current context of the text of the content item. In these instances, the user 704 may access the dictionary system 702 to provide a list of definitions, pronunciation keys, audio pronunciations, example sentences, among other items to provide additional context for understanding the word 708.

In some cases, the dictionary system 702 may include a definition module 710. The definition module 710 may be configured to receive the word 708 form the user device 706, and to access one or more dictionary databases 712 to obtain one or more definitions 714 associated with the word 708. For example, the definition module 710 may obtain definitions 714 in the language of the content item being consumed by the user 704, as well as a corresponding definition of the word 708 in the native language of the user 704. In some cases, the dictionary database 712 may also include one or more sentences or use cases for the word 708 for each definitions 714, such that the user 704 may be able to read the word 708 in a sentences that uses the word 708 in a manner related to the corresponding definition 714.

In some cases, the dictionary system 702 may include a pronunciation module 716. The pronunciation module 716 may be configured to receive the word 708 form the user device 706, and to access one or more pronunciation databases 718 to obtain one or more pronunciations 720 associated with the word 708. In some cases, the pronunciations 720 may include one or more pronunciation keys and/or audio signals to cause a speaker to output the pronunciation of the word 708 as sound for each different pronunciation 720 related to the word 708. In one example, the pronunciation module 716 may obtain pronunciation 720 in the language of the content item being consumed by the user 704, as well as a corresponding pronunciation of the word 708 in the native language of the user 704.

The dictionary system 702 may also include a ranking module 722 to rank the definitions 714 and/or pronunciation keys 720 based at least in part on the context of the text of the content item being consumed by the user 702. For instance, the device 704 may provide some portion of text (e.g., number of words before and/or after the word 708 in the text, the sentence including the word 708 of the text, the paragraph contacting the word 708, a number of paragraphs before and/or after the word 708, the page of text associated with the word 708, etc.). The ranking module 722 may be configured to process the text of the content item received from the device 706 to determine a context or subject matter associated with the word 708. The ranking module 722 may then rank the definitions 714 based at least in part on a relatedness of the definition 714 to the context or subject matter. In this manner, the user 702 may be presented with the most likely appropriate definition 714 first, thereby reducing confusing and/or time spent learning a particular word 708.

In some implementations, the devices 706 may provide a corpus of text in addition to the words 708. The keyword identification module 724 may be configured to analyze the corpus of text to determine key words associated with the text that may be used by the ranking module 722 to further assist with ordering the definitions 714. In other examples, the keyword identification module 724 may be configured to analyze the text for a next difficult word or next study word as indicated by the user. In these examples, the user may select to move to the next difficult word or the next study word and to cause definitions associated with the next difficult word or study word in the text as identified by the keyword identification module 724.

As described above, in some situations, a first definition 714 in the language of the text may correspond to a first word in the native language of the user and a second definition 714 may correspond to a second word different form the first word in the native language of the user or vice versa. In these situations, the dictionary system 702 may include a sense alignment module 726 to align the definitions 714 with the corresponding word in the native language of the user. For example, the word 104 "Representatives" in English may mean both "a person or thing that represents another or others" and "an agent or deputy". However, in Japanese the word for "a person or thing that represents another or others" may be different from the word that signifies an agent or deputy". Thus, by selection the options 312-316, the user may view a native language word that is associated with the displayed definition.

In the illustrated example, the dictionary system 702 may be in communication with the dictionary database 712, the pronunciation database 722, and/or the user devices 706(1)-(N) via one or more networks, generally illustrated by networks 724-726. The networks 724-726 may be representative of wired technologies (e.g., wires, USB, fiber optic cable, etc.), wireless technologies (e.g., RF, cellular, satellite, Bluetooth, etc.), or other connection technologies. The networks 724-726 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

FIGS. 8 and 9 are flow diagrams illustrating example processes associated with the dictionary system associated with foreign language learning. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 8 illustrates an example flow diagram showing an illustrative process 800 for providing foreign language dictionary definitions. From time to time while a user is consuming a content item in a foreign language, the user may come across a word in the foreign language that the user is unfamiliar with or does not understand given the current context of the text of the content item. In these instances, the user may access the dictionary system to provide a list of definitions, pronunciation keys, audio pronunciations, example sentences, among other items to provide additional context for understanding the word.

At 802, a dictionary system may receive a word and/or text associated with the word from a foreign language learning application operating on a user device. For example, the word may be in a language that the user does not fully understand and is attempting to learn by consuming content via the foreign language learning application. Thus, the user may access a dictionary capability to provide additional information and/or content associated with the difficult word. In some cases, the text a number of words before and/or after the word in the text, the sentence including the word of the text, the paragraph contacting the word, a number of paragraphs before and/or after the word, the page of text associated with the word, among other portions of the content item.

At 804, the dictionary system obtains definitions associated with the words from one or more databases. In some cases, the databases may be part of the dictionary system in other cases the databases may be third party dictionary databases accessible by the dictionary system.

At 806, the dictionary system may edit the definition. For example, due to limited space on a mobile device display, the dictionary system may shorten each of the definitions o be less than a predetermined number of characters (e.g., less than 70 characters). In other cases, the dictionary system may edit the definition to remove or replace words that may be difficult for a non-native speaker to understand.

At 808, the dictionary system may obtain one or more pronunciation associated with the word from a pronunciation database. In some cases, the pronunciation database may be part of the dictionary system in other cases the pronunciation database may be third party pronunciation database accessible by the dictionary system. In some particular examples, the dictionary database and the pronunciation database may be the same, such as in examples, where each definition includes a corresponding pronunciation key.

At 810, the dictionary system may determine a context of the word based at least in part on an analysis of the text provided by the user device in conjunction with the word. For example, the dictionary system may parse the text to determine a subject matter of the text or to determine which part of speech the word is currently being used as. In some particular implementations, the dictionary system may also determine the context based on information related to the content item available via a third party publisher or as part of the dictionary system.

At 812, the dictionary system may rank the definitions based at least in part on the word and the context determined at 808. The dictionary system may be configured to select the most likely applicable definition based on the subject matter of the text surrounding the word and the use of the word within the text.

At 814, the dictionary system may provide the pronunciation keys and the definitions to the user device such that the user is able to view the pronunciation keys and definitions within the text of the content item, as describe above with respect to FIGS. 2 and 3.

FIG. 9 illustrates an example flow diagram showing an illustrative process 900 for selecting definitions to provide as foreign language dictionary definitions. For example, the word may be in a language that the user does not fully understand and is attempting to learn by consuming content via the foreign language learning application. Thus, the user may access a dictionary capability to provide additional information and/or content associated with the difficult word. In some cases, the text a number of words before and/or after the word in the text, the sentence including the word of the text, the paragraph contacting the word, a number of paragraphs before and/or after the word, the page of text associated with the word, among other portions of the content item.

At 902, a foreign language learning application operation on a device receives request form the user to look up a definition of a word associated with text of a content item displayed on the display of the device. For example, the user may pause the output of the content item and long press, tap, or otherwise select a particular word of the text currently displayed by the device. In other examples, the user may highlight the word and select a dictionary option to generate the request.

At 904, device provides the request to a dictionary system. In some cases, the dictionary system may be part of the foreign language learning application operating on the device. For instance, the foreign language learning application or the content item may store definitions associated with words that are commonly looked up or known to be difficult. In these instances, the foreign language learning application may access the stored definitions. In other instances, the device may provide the request to a remote system, such as the dictionary system illustrated with respect to FIG. 7, via one or more communication interfaces.

At 906, the dictionary system may edit the definition. For example, due to limited space on a mobile device display, the dictionary system may shorten each of the definitions o be less than a predetermined number of characters (e.g., less than 70 characters). In other cases, the dictionary system may edit the definition to remove or replace words that may be difficult for a non-native speaker to understand.

At 908, the dictionary system receives the request from the device to look up a definition of the word. For example, the request may include the word as well as text associated with the word to provide the dictionary system with a context associated with the word's use in the content item. In some cases, the text may include a number of words before and/or after the word in the text, the sentence including the word of the text, the paragraph contacting the word, a number of paragraphs before and/or after the word, the page of text associated with the word, among other portions of the content item.

At 910, the dictionary system requests definitions associated with the word from one or more dictionary providers. In some cases, the dictionary providers may be a database that is part of the dictionary system in other cases the dictionary providers may be third party dictionary databases accessible by the dictionary system.

At 912, the dictionary providers may receive the notification. The dictionary providers may then select definitions, pronunciation keys, audio pronunciations, example sentences or paragraphs illustrating the use of the word given a particular definition, etc. At 914, the dictionary providers provides the definitions back to the dictionary system.

At 916, the dictionary system may rank the definitions based at least in part on the context of the text. For example, the dictionary system may be configured to select the most likely applicable definition based on the subject matter of the text surrounding the word and the use of the word within the text.

At 918, the dictionary system provides the ranked set of definition to the device. In some instances, the ranked set of definitions may be less than all of the definitions returned by the dictionary providers. For example, the dictionary system may return the top three dictionary results or the top five most related results to prevent the user from getting lost in the number of definitions unrelated to the context of the word given the surrounding text.

At 920, the foreign language learning application operation on a device presents the definitions to the user via a display. For example, the foreign language learning application may cause the device to display the definitions between the text of the content item, such that the word, the definitions, and at least some of the text associated with the word may be displayed concurrently on the display of the device.

Figure 10:
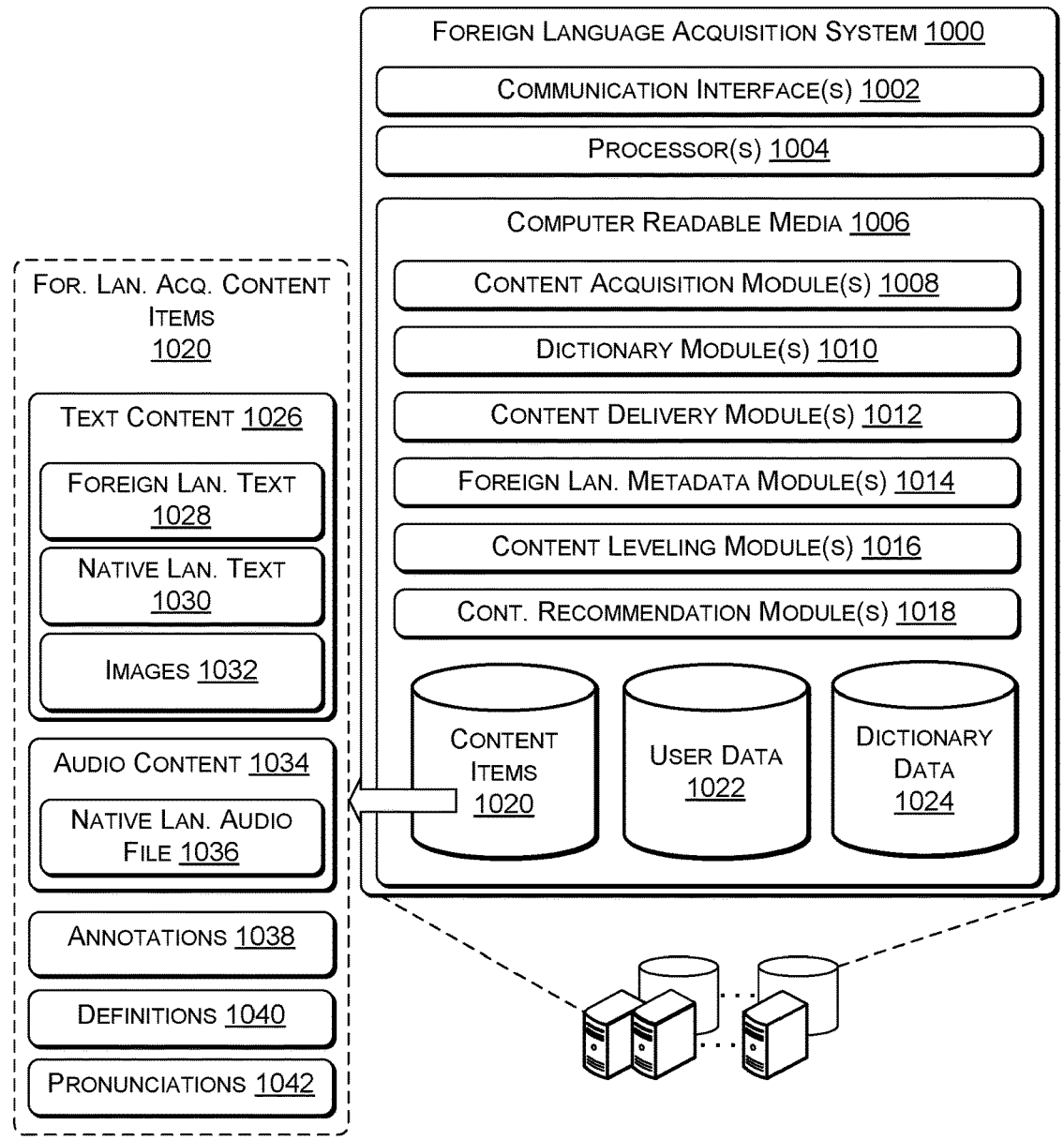
FIG. 10 illustrates an example architecture of a system configured to provide dictionary functionally associated with foreign language learning.

FIG. 10 illustrates an example architecture of a system 1000 configured to provide guided foreign language learning. In some implementations, the foreign language learning system described herein may include applications hosted by one or more user devices as well as various cloud based services hosted on one or more servers and/or database remote from the end users. For example, the cloud services may include any number of network accessible platforms implemented as a computing infrastructure of processors, storage, software, data access, and so forth that is maintained and accessible via a network such as the Internet. The cloud services 606 do not require end-user knowledge of the physical location and configuration of the system that delivers the services. Common expressions associated with cloud services 806 include "on-demand computing," "software as a service (SaaS)," "platform computing," "network accessible platform" and so forth.

In the illustrated example, the system 1000 includes one or more communication interfaces 1002, one or more processors 1004, and computer computer-readable media 1006. The communication interfaces 1002 may facilitate communication between one or more wireless access points, a master device and/or one or more other computing devices as part of an ad-hoc or home network system. The communication interfaces 1002 may be used to communicate with other local devices and may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interfaces 1002 may facilitate streaming or audio and/or text content, as well as definition and pronunciation lookups to one or more user devices to provide foreign language learning content to an end user.

The processors 1004 may be one or more accesses components such as at least one or more control logic circuits, central processing units, or processors, and one or more computer-readable media 1006 to perform the function of the system 1000. Additionally, each of the processors 1004 may itself comprise one or more processors or processing cores.

Depending on the configuration of the system 1000, the computer-readable media 1506 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 1004.

Various instruction, information, data stores, and so forth may be stored within the computer-readable media 1006 and configured to execute on the processors 1004. For instance, the computer-readable media 1006 may store one or more modules or applications, such as a content learning module 1008, a dictionary module 1010, a content delivery module 1012, a foreign language metadata module 1014, a content leveling module 1016, and/or a content recommendation module 1016. The computer-readable media 1006 may also store various data, such as electronic content items 1020, user data 1022, and/or dictionary data 1024. In some examples, the applications or modules may include instructions which when executed by the processors 1004 to cause the foreign language learning applications operation on user devices to perform various functions. For example, the applications may include an application to allow a user to consume foreign language content items via an application operating on the user device.

The content learning module 1008 may be configured to identify or receive content items from the third party content provides (such as publishers, writers, authors, distributors, etc.). The content learning module 1008 upon receipt of a particular content item 1020 or title, contact one or more third party content providers in order to acquire the rights to distribute a foreign language content item (e.g., the foreign version of the same content item, such as the Japanese language equivalent of an the English language content item). The content learning module 1008 may also contact one or more third party audio content providers to acquire the rights to the audio version for the desired foreign language.

The dictionary module 1010 may obtain dictionary definitions and pronunciations for words associated with the content items in the language being acquired. For example, the dictionary module 1010 may be configured to receive a request for a definition and/or pronunciation associated with a word from a user device. The dictionary module 1010 may access the dictionary data 1024 sand/or data available via a third party dictionary provider to obtain one or more definitions and/or pronunciations associated with the word. In some cases, the dictionary module 1010 may rank the definitions according to a likelihood of being the appropriate definition based on a context (e.g., some portion of text received with the word, subject matter associated with the content item containing the word, other data associated with the content item containing the word, etc.). The dictionary module 1010 may then provide the definitions to the user device via the commination interfaces 1002.

The content delivery module 1012 may assist with delivering one or more of the content items 1020 to a user device and synchronizing the audio output provided by the third party audio content delivery system with the text of the content item 1020 at the user device. For example, the content delivery module 1012 may facility downloading or streaming of the content items 1020 to the user device. The content delivery module 1012 may also receive notifications from the user device when the user is consuming the content item 1020 and, for instance, via the notification the content delivery module 1012 may monitor the output of the audio content with the text of the content items 1020 to ensure the output is synchronized.

The foreign language metadata module 1014 may be configured to, for example, associated foreign language metadata to each of the content items 1020 in order to assist the foreign language reader with selecting a title of interest. For example, the foreign language metadata module 1014 may assign language identifies associated with genre, characters, plot, subject matter, title, etc. In the foreign language to assist with title selection. In this manner, the foreign language reader may select titles of interest by previewing the foreign language tags rather than merely selecting a title with no concept of the subject matter or based on the foreign reader's current limited understanding of language being acquired.

The content leveling module 1014 may be configured to rank a difficultly associated with each of the content items 1020. For example, the content leveling module 1014 may upon receipt of a native language content item 1030, strip punctuation and case from the text of the content item, tokenize whitespace and special characters, and identify individual words of the text. The content leveling module 1014 may then compare the identified words with one or more dictionaries, such as the NGSL, to identify the number or percentage of words in the text of the content item or title that are also present in the dictionary. The content leveling module 1014 may make a determination as to the difficult of a particular content item 1020 based in part on the number of words appearing in the dictionary or the percentage of words in the dictionary. The content leveling module 1014 may also consider the length of the words, the length of the definitions, the number of definitions, the number of syllables, the length of the pronunciation key, etc.

The content recommendation module 1016 may be configured to recommend content items 1020 that may be of interest to particular readers acquiring a foreign language. In some cases, the content recommendation module 1016 may select the recommended titles based at least in part on information known about the reader (e.g., previously consumed titles in the foreign language and/or in the readers native language, titles abandoned by the user, user survey data, user settings, user browsing history, search history, time spent on similar titles etc.), information known about the language learning content, items (e.g., chapter titles, native language metadata tags, foreign language metadata tags, publisher information, subject matter, content difficulty level, etc.), as well as information aggregated across users (e.g., user comments, what other content items or titles were consumed by readers that completed the recommend language learning content items 836, etc.) current on selected titles, completed titles, abandoned titles (e.g., titles that the reader failed to finish).

In some implementations, one or more of the content items 1020 may be stored on the system 1000 or in a database associated with the system 1000. Each content item 1020 may include text content 1026, such as foreign language text 1028, native language text 1030, and/or images 1032 or graphics. The content items 1020 may also include audio content 1034, such as the audio file 1036 in the native language of the content item 1020. In some particular implementations, the content item 1020 may also include annotations 1038, dictionary definitions 1040, and/or audio and/or text pronunciations 1042. For example, in some implementations, the foreign language learning application operating on the user device may be able to provide the user with some definitions (such as commonly miss understood words or difficult to learn words) without accessing the remote dictionary definitions module 1010. In some specific implementations, the content items 1020 may include electronic books or "eBooks" as well as audio books. For example, eBooks may include text and any illustrations, tables, or graphic elements that might be contained in a print version of the eBook and the audio books may include recordings of one or more individuals reading the book.

In some cases, the content items 1020 may include electronic or digital representations of printed works, as well as multimedia objects, hypertext, and/or hypermedia. In other implementations, the content items 1020 may include digital copies of magazines, newspapers, periodicals, journals, reference materials, telephone books, textbooks, anthologies, instruction manuals, proceedings of meetings, forms, directories, maps, web pages, and so forth.

The computer-readable media 1006 may also store the user data 1022 and the dictionary data 1024 that may be accessible to one or more of the systems 1008-1016 for assistance in providing the foreign language learning, such as the dictionary module 1010 as described above. In another example, the user data 1022 may be utilized the by the content recommendation system 1018 to select one or more content items 1020 to recommend to the user for consumption.

Figure 11:
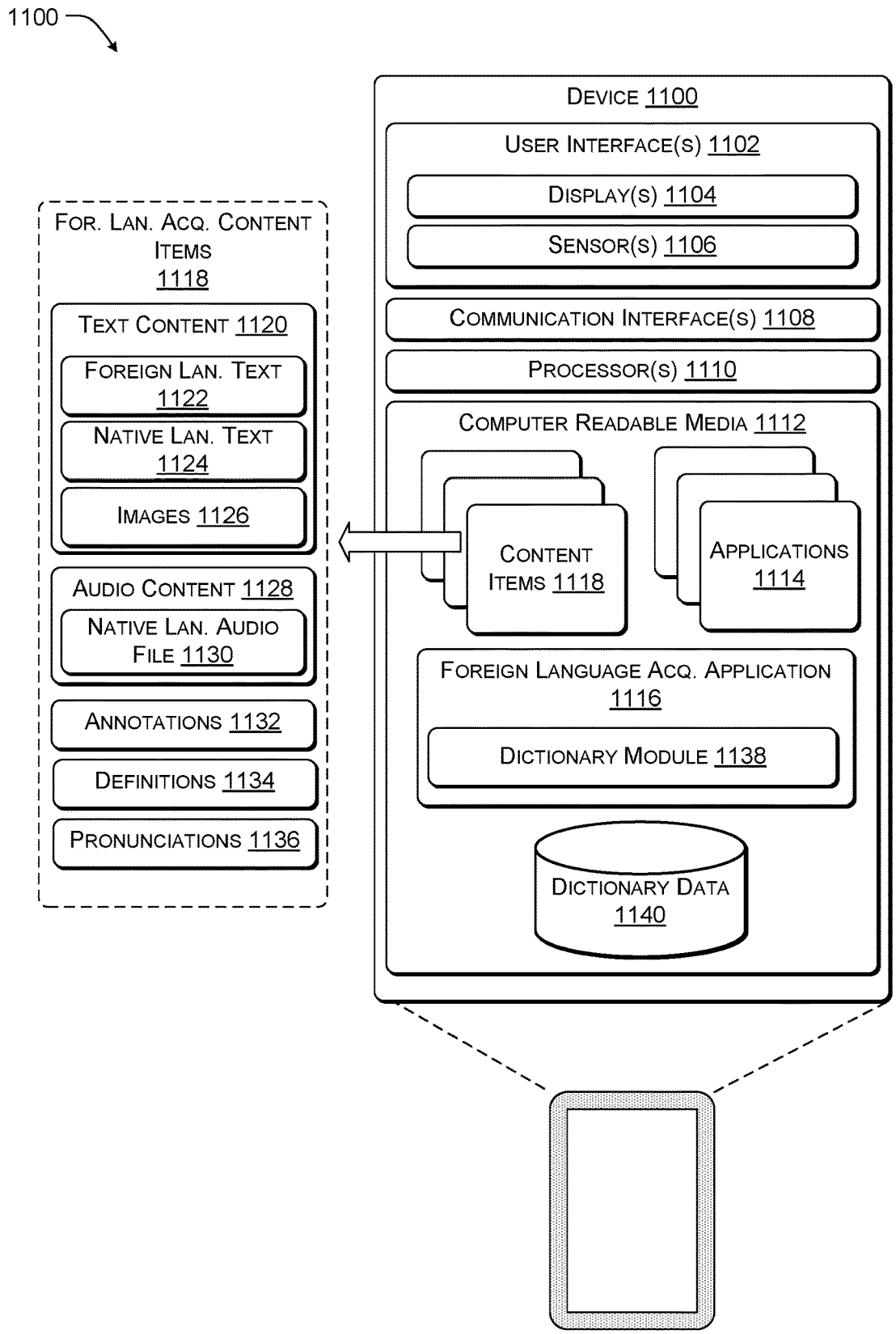
FIG. 11 illustrates an example architecture of a device configured to provide dictionary functionally associated with foreign language learning.

FIG. 11 illustrates an example architecture of a device 1100 configured to provide guided foreign language learning. In some implementations, the user may access the foreign language learning system via a user device, such as electronic book readers, cellular telephones, smart phones, portable media players, tablet computers, wearable computers, laptop computers, netbooks, desktop computers, televisions, appliances, home electronics, automotive electronics, augmented reality devices, and so forth to view and/or listen to digital content.

The device 1100, generally, includes one or more user interfaces 1102 for presenting information or data and for receiving user inputs. The user interfaces 1102 may include one or more output components, such as a display or touch screen, and one or more input components, such as keyboards, keypads, joysticks, a mouse, a touch screen, touch pad, drawing pad, or control buttons. In some implementations, the output components and input components are combined in a single user interface 1102 to provide a touch-sensitive display, or touch screen display. For instance, in the illustrated example, the user interface 1102 includes one or more displays 1104 for presenting information, such as content items, to a user, one or more sensors 1106 for accepting input resulting from contact and/or application of incident force, such as a user finger or stylus pressing upon one of the sensor 1106. In some specific implementations, the device 1100 may be configured to receive user inputs by communicating with an active stylus. For example, the active stylus and the device 1600 may actively exchange data related to the user inputs.

In some cases, the sensors 1106 may be a touch sensor couple to a touch layer (not shown), such as an indium tin oxide (ITO) layer arranged in a grid pattern below the top surface of the display 1604. In this case, the touch sensor is configured to determine characteristics of user interaction with the display 1104 detected by the ITO layer. These characteristics may include the location of the touch on the display 1604, magnitude of the force, shape of the touch, and so forth.

In some implementations, the display 1104 may present content in a human-readable format to a user. The display 1104 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays (LCDs), time multiplexed optical shutter displays, light emitting diode (LED) displays, and so forth. When multiple displays are present, these displays may be of the same or different types. For example, one display may be an electrophoretic display while another may be a liquid crystal display. In some implementations, multiple displays 1104 may be present and/or coupled to the device 1100. These multiple displays 1104 may be located in the same or different enclosures or panels.

For convenience, the display 1104 is shown in FIGS. 1-5 in a generally rectangular configuration. However, it should be understood that the display 1104 may be implemented in any shape, and may have any ratio of height to width. Also, for stylistic or design purposes, the display 1104 may be curved or otherwise non-linearly shaped. Furthermore, the display 1104 may be flexible and configured to fold or roll.

The device 1100 also includes one or more communication interfaces 1108 to facilitate communication between one or more networks (such as the Internet® or one or more local area networks), directly with one or more devices, and/or with one or more cloud services (such as the foreign language learning system). The communication interfaces 1108 may also facilitate communication between one or more wireless access points, a master device, and/or one or more other computing devices as part of an ad-hoc or home network system. The communication interfaces 1108 may support both wired and wireless connection to various networks, such as cellular networks, radio, WiFi networks, short-range or near-field networks (e.g., Bluetooth®), infra-red signals, local area networks, wide area networks, the Internet, and so forth.

The device 1100 includes or accesses components such as at least one or more control logic circuits, central processing units, or processors 1110, and one or more computer-readable media 1112 to perform the function of the device 1100. Additionally, each of the processors 1110 may itself comprise one or more processors or processing cores.

Depending on the configuration of the device 1100, the computer-readable media 1112 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 1110.

Various instruction, information, data stores, and so forth may be stored within the computer-readable media 1112 and configured to execute on the processors 1110. For instance, the computer-readable media 1112 may store one or more applications 1114, such as a foreign language learning application 1116) and/or one or more foreign language learning content items 1118. In some cases, the foreign language learning application 1116 may include instructions which when executed by the processors 1110 cause the device 1100 to guide the user through consuming a foreign language learning content item 1118. For example, in the illustrated example, the foreign language learning application 116 includes a dictionary module 1138 for processing user requests to view definitions and/or pronunciations key associated with a word.

In some implementations, one or more of the foreign language learning content items 1118 may be stored on the device 1100, while other foreign language learning content items may be store in a remote database associated with the foreign language learning system available to stream or download to the device 1100. Each content item 1118 may include text content 1120, such as foreign language text 1122, native language text 1124, and/or images 1126 or graphics. The content items 1118 may also include audio content 1128, such as the audio file 1130 in the native language of the content item 1118. In some particular implementations, the content item 1118 may also include annotations 1132, dictionary definitions 1134, and/or audio and/or text pronunciations 1136.

In addition to the foreign language learning content items 1118, in some implementations, the computer readable media 1112 may also store dictionary data 1140. In these cases, the foreign language learning application may access the dictionary data 1140 stored on the device 1100 in lieu of the dictionary module 1138 accessing cloud service to obtain the definitions on a case by case basis.

In some specific implementations, the content items 1118 may include electronic books or "eBooks" as well as audio books. For example, eBooks may include text and any illustrations, tables, or graphic elements that might be contained in a print version of the eBook and the audio books may include recordings of one or more individuals reading the book. In some cases, the content items 1118 may include electronic or digital representations of printed works, as well as multimedia objects, hypertext, and/or hypermedia. In other implementations, the content items 1118 may include digital copies of magazines, newspapers, periodicals, journals, reference materials, telephone books, textbooks, anthologies, instruction manuals, proceedings of meetings, forms, directories, maps, web pages, and so forth.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    under control of one or more computer systems configured with executable instructions,
    causing a display to present content data that includes one or more words in a first language;
    receiving an indication of a selection of a first word of the one or more words;
    identifying definition data associated with the first word, wherein the definition data includes a first definition in a second language that is different than the first language, a second definition in the second language, and the second definition in the first language;
    causing the display to concurrently present the one or more words in the first language, the first definition in the second language, the second definition in the second language, a first pronunciation option in the second language, a second pronunciation option different than the first pronunciation option in the second language, and a definition option icon in the second language, wherein the first definition and the second definition are presented between a first row of the one or more words and a second row of the one or more words, the first definition is positioned proximate to the second definition, the first pronunciation option is presented adjacent to the first definition, the second pronunciation option is presented adjacent to the second definition, and the definition option icon is presented adjacent to the first definition;
    receiving an indication of a selection of the definition option icon; and
    causing the display to present the second definition in the first language replacing the second definition in the second language.

2. The method of claim 1, further comprising:
    receiving an indication of a selection of the first pronunciation option;
    identifying first pronunciation data associated with the first word; and
    causing the display to concurrently display each of the one or more words in the first language, the first pronunciation option in the second language, the first pronunciation option to replace the first definition on the display.

3. The method of claim 1, further comprising:
    sending audio data to an audio output device based at least in part on the selection of the option icon, the audio data representative of the word output as sound in the first language.

4. The method of claim 1, further comprising:
    causing each of the one or more words, the definition data, an option icon adjacent to the definition data to display concurrently;
    receiving an indication of a selection of the option icon; and
    sending audio data to an audio output device based at least in part on the selection of the option icon, the audio data representative of the word output as sound in the second language.

5. The method of claim 1, further comprising:
    identifying a sentence including the first word, the sentence in the second language; and
    sending audio data to an audio output device based at least in part on the selection of the option icon, the audio data representative of the sentence output as sound in the first language.

6. The method of claim 1, further comprising:
    identifying a sentence including the word, the sentence in the second language; and
    sending audio data to an audio output device based at least in part on the selection of the option icon, the audio data representative of the sentence output as sound in the second language.

7. The method of claim 1, further comprising:
    causing the display to concurrently display the one or more words in the first language and an additional word in the second language, the additional word in the second language sharing a definition with the first word.

8. The method of claim 1, further comprising causing each of the one or more words in the first language and the definition data in the second language to display concurrently with:
    a definition language option icon adjacent to the definition data, the definition language option icon in the second language;
    a pronunciation option adjacent to the definition data, the pronunciation option in the second language;
    an audio output option adjacent to the definition data; and
    a native word option adjacent to the definition data.

9. The method of claim 1, further comprising:
    causing a speaker to output audio data at a narration speed, the audio data associated with the one or more words and in a first language; and causing the speaker to pause the output of the audio data based at least in part on receiving the indication of the selection of the first word.

10. The method of claim 1, wherein the display comprises a touch-sensitive display and receiving the indication of the selection of the option icon comprises receiving an input at the touch-sensitive display.

11. A device comprising:
one or more processors;
a display;
a computer-readable media having computer-executable instructions that, when executed by the one or more processors, cause the one or more processors to perform operations comprising:
causing content data to be presented on the display during a first period of time, the content data including a plurality of words displayed in a first language;
receiving an indication of a selection of a first word of the plurality of words in the first language during the first period of time;
accessing first definition data, second definition data, alternative spelling data, and tense data associated with the first word of the plurality of words;
causing related word data to be presented on the display, the related word data including a second word related to the first word;
causing the first definition data, second definition data, alternative spelling data, the tense data, the plurality of words displayed during the first period of time, and an option icon to be presented concurrently on the display during a second period of time, the plurality of words, the alternative spelling data, and the tense data being presented in the first language, the first definition data and the second definition data being presented in a second language different from the first language, and the option icon being presented adjacent to the first definition data;
receiving an indication of a selection of the option icon; and
causing, at least partly in response to the selection of the option icon, the second definition data to be presented in the first language replacing the second definition data being presented in the second language.

12. The device of claim 11, wherein the computer-readable media stores computer-executable instructions that, when executed by the one or more processors, cause the one or more processors to perform operations comprising:
identifying pronunciation data associated with the first word of the plurality of words; and
causing the pronunciation data and each word of the plurality of words to be presented on the display during a third period of time, the pronunciation data being presented in the first language.

13. The device of claim 11, wherein the first definition data includes at least two definitions associated with the first word, the at least two definition presented in the second language.

14. The device of claim 13, wherein the computer-readable media stores computer-executable instructions that, when executed by the one or more processors, cause the one or more processors to perform operations comprising:
receiving an indication of a selection;
identifying pronunciation data associated with the first word of the plurality of words; and
causing the pronunciation data and each word of the plurality of words to be presented on the display during a third period of time, the pronunciation data being presented in the first language.

15. The device of claim 11, further comprising an audio output device and wherein the computer-readable media stores computer-executable instructions that, when executed by the one or more processors, cause the one or more processors to perform operations comprising:
receiving an indication of a selection;
identifying audio data associated with the first word of the plurality of words; and
sending audio data to the audio output device, the audio data representative of the first word in the first language.

16. The device of claim 11, wherein the computer-readable media stores computer-executable instructions that, when executed by the one or more processors, cause the one or more processors to perform operations comprising:
causing sentence data, the definition data, and each word of the plurality of words to be presented concurrently on the display during the second period of time.

17. A non-transitory computer-readable media having computer-executable instructions that, when executed by one or more processors, cause the one or more processors to perform operations comprising:
causing one or more words to be presented on a display in a first language during a first period of time;
receiving an indication of a selection of a first word of the one or more words;
identifying definition data associated with the first word, the definition data including a first definition in a second language that is different than the first language, a second definition in the second language, and the second definition in the first language;
causing a display component to concurrently display the first definition in the second language, the second definition in the second language, a definition language option icon in the second language, a pronunciation option in the second language, a native word option in the second language, a study word icon, and the one or more words in the first language during a second period of time, the definition data including a definition associated with the first word of the one or more words, and the definition language option icon being displayed adjacent to the first definition;
receiving an indication of a selection of the definition language option icon; and
causing the display component to display the second definition in the first language replacing the second definition in the second language.

18. The non-transitory computer-readable media of claim 17, wherein the computer-readable media stores computer-executable instructions that, when executed by the one or more processors, cause the one or more processors to perform operations comprising:
causing pronunciation data associated with the first word to be presented on the display concurrently with each word of the one or more words during a third period of time.

19. The non-transitory computer-readable media of claim 17, further comprising an audio output device and wherein the computer-readable media stores computer-executable instructions that, when executed by the one or more processors, cause the one or more processors to perform operations comprising:
sending audio data to the audio output device during the second period of time, the audio data representative of the first word in the first language.

20. The non-transitory computer-readable media of claim 17, wherein the computer-readable media stores computer-executable instructions that, when executed by the one or more processors, cause the one or more processors to perform operations comprising:
  causing related word data including a second word associated with the first word to be displayed on the display concurrently with each word of the one or more words during a third period of time.

* * * * *